(12) United States Patent
Liu et al.

(10) Patent No.: US 12,402,011 B2
(45) Date of Patent: Aug. 26, 2025

(54) RESOURCE INDICATION METHOD AND APPARATUS

(71) Applicant: Huawei Technologies Co., Ltd., Shenzhen (CN)

(72) Inventors: Fengwei Liu, Chengdu (CN); Shitong Yuan, Chengdu (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 452 days.

(21) Appl. No.: 17/672,414

(22) Filed: Feb. 15, 2022

(65) Prior Publication Data

US 2022/0174498 A1 Jun. 2, 2022

Related U.S. Application Data

(63) Continuation of application No. PCT/CN2019/103508, filed on Aug. 30, 2019.

(30) Foreign Application Priority Data

Aug. 30, 2019 (WO) ................ PCT/CN2019/103508

(51) Int. Cl.
*H04W 16/10* (2009.01)
*H04W 72/044* (2023.01)
*H04W 72/20* (2023.01)

(52) U.S. Cl.
CPC ......... *H04W 16/10* (2013.01); *H04W 72/044* (2013.01); *H04W 72/20* (2023.01)

(58) Field of Classification Search
CPC ... H04W 16/10; H04W 72/20; H04W 72/044; H04W 84/047; H04L 5/0032; H04B 7/15542
See application file for complete search history.

(56) References Cited

U.S. PATENT DOCUMENTS

2022/0182977 A1\* 6/2022 Miao ..................... H04W 72/51

FOREIGN PATENT DOCUMENTS

| CN | 101946549 A | 1/2011 |
|---|---|---|
| CN | 102484810 B | 2/2014 |

(Continued)

OTHER PUBLICATIONS

Ericsson, 3GPP TSG-RAN WG1 Meeting #96, R1-1903226, "IAB resource configuration and assignment," (Year: Mar. 2019).\*

(Continued)

*Primary Examiner* — Mandish K Randhawa
(74) *Attorney, Agent, or Firm* — Leydig, Voit & Mayer, Ltd.

(57) ABSTRACT

A resource indication method and apparatus are provided, to implement resource indication in a case in which a distributed unit (DU) has a plurality of cells. The method includes: a first node receives indication information from a second node, where the indication information is used to indicate availability of a dynamic resource in first resources corresponding to P cells, the first resource is a transmission resource used by the first node to communicate with a third node, the second node is an upper-level node of the first node, and the third node is a lower-level node of the first node. The first node determines the availability of the dynamic resource in the first resources of the P cells based on the indication information, where 1≤P≤N.

15 Claims, 12 Drawing Sheets

(56) References Cited

FOREIGN PATENT DOCUMENTS

| CN | 110011774 A | 7/2019 |
|---|---|---|
| JP | 2007306572 A | 11/2007 |
| WO | 2010122419 A2 | 10/2010 |
| WO | 2019013967 A1 | 1/2019 |

OTHER PUBLICATIONS

CEWiT, IIT-M, IIT-H, IIT-D, Reliance Jio, "Discussions on resource multiplexing among backhaul and access links," 3GPP TSG RAN WG1 Meeting #97, Reno, Nevada, R1-1907351, total 11 pages, 3rd Generation Partnership Project, Valbonne, France (May 13-17, 2019).
Ericsson, "IAB resource configuration and multiplexing," 3GPP TSG-RAN WG1 Meeting #97, Reno, U.S., R1-1906588, total 9 pages, 3rd Generation Partnership Project, Valbonne, France (May 13-17, 2019).
"3rd Generation Partnership Project; Technical Specification Group Radio Access Network;NR;Multiplexing and channel coding (Release 15)," 3GPP TS 38.212 V15.6.0, total 101 pages, 3rd Generation Partnership Project, Valbonne, France (Jun. 2019).
"3rd Generation Partnership Project; Technical Specification Group Radio Access Network;NR;Physical layer procedures for control (Release 15)," 3GPP TS 38.213 V15.6.0, total 107 pages, 3rd Generation Partnership Project, Valbonne, France (Jun. 2019).
ZTE, Sanechips, "Resource multiplexing between backhaul and access links," 3GPP TSG RAN WG1 #97, Reno, USA, R1-1906491, total 5 pages, 3rd Generation Partnership Project, Valbonne, France (May 13-17, 2019).
Qualcomm Incorporated, "Updated IAB Resource Management Framework," 3GPP TSG RAN WG1 Meeting #97, , Reno, USA, R1-1907267, total 7 pages, 3rd Generation Partnership Project, Valbonne, France (May 13-17, 2019).
Qualcomm Incor4porated, "Enhancements to support NR backhaul links," 3GPP TSG RAN WG1#95, Spokane, USA, R1-1813417, 3GPP, 3rd Generation Partnership Project, Valbonne, France, Total 18 pages (Nov. 12-16, 2018).
Sharp, "DL control search spaces for resource management for IAB," 3GPP TSG RAN WG1 NR#96bis, Xi'an, China, R1-1904877, 3rd Generation Partnership Project, Valbonne, France, Total 5 pages (Apr. 8-12, 2019).
"IAB resource configuration and assignment," 3GPP TSG-RAN WG1 Meeting #96, Athens, Greece, R1-1903226, Total 6 pages, 3rd Generation Partnership Project, Valbonne, France (Feb. 25-Mar. 1, 2019).
"Resource multiplexing between backhaul and access in IAB," 3GPP TSG RAN WG1 Meeting #97, Reno, USA, R1-1906001, Total 9 pages, 3rd Generation Partnership Project, Valbonne, France (May 13-17, 2019).
"Mechanisms for Resource Multiplexing among Backhaul and Access links," 3GPP TSG RAN WG1 #97, Reno, USA, R1-1906792, Total 7 pages, 3rd Generation Partnership Project, Valbonne, France (May 13-17, 2019).
"Mechanisms for resource multiplexing among backhaul and access links," 3GPP TSG RAN WG1 Meeting #97, Reno, NV, USA, R1-1907116, Total 16 pages, 3rd Generation Partnership Project, Valbonne, France (May 13-17, 2019).

* cited by examiner

| Subframe number | 0 | 1 | 2 | 3 | 4 | 5 | 6 | 7 | 8 | 9 |
|---|---|---|---|---|---|---|---|---|---|---|
| IAB node downlink backhaul | N | N | D | N | D | N | D | N | N | N |
| IAB node downlink access | D | D | N | D | N | D | N | D | D | D |

FIG. 7

|        | 0 | 1 | 2 | 3 | 4 |
|--------|---|---|---|---|---|
| Cell 0 | S | H | H | H | S |
| Cell 1 | S | H | S | H | H |

FIG. 14

|        | 0 | 1 | 2 | 3 | 4 |
|--------|---|---|---|---|---|
| Cell 1 | S | H | H | H | S |
| Cell 2 | S | H | S | H | H |
| Field  | O | X | O | X | O |

FIG. 15

|                                      | 0 | 1 | 2 | 3 | 4 |
|--------------------------------------|---|---|---|---|---|
| Cell 1                               | S | H | H | H | S |
| Field corresponding to the cell 1    | O | X | X | X | O |
| Cell 2                               | S | H | S | H | H |
| Field corresponding to the cell 2    | O | X | O | X | X |

FIG. 16

RESOURCE INDICATION METHOD AND APPARATUS

CROSS-REFERENCE TO RELATED APPLICATIONS

This application is a continuation of International Application No. PCT/CN2019/103508, filed on Aug. 30, 2019, which claims priority to International Application No. PCT/CN2019/100773, filed on Aug. 15, 2019. The disclosures of the aforementioned applications are hereby incorporated by reference in their entireties.

TECHNICAL FIELD

This application relates to the field of communication technologies, and in particular, to a resource indication method and apparatus.

BACKGROUND

With continuous development of mobile communication technologies, spectrum resources are increasingly strained. To improve spectrum utilization, base stations are to be deployed more densely in the future. In addition, dense deployment may further avoid coverage holes. A wireless relay node (RN) establishes a connection to a core network through a wireless backhaul link, to reduce some costs of deployment of optical fibers. In new radio (NR), a relay node establishes a wireless backhaul link to one or more upper-level nodes, and accesses a core network through the upper-level node. An access link is established between the relay node and a user equipment (UE). The upper-level node may control (for example, perform data scheduling, timing modulation, and power control on) the relay node by using a plurality of types of signaling. In addition, the relay node may serve one or more lower-level nodes. The upper-level node of the relay node may be a base station, or may be another relay node. The lower-level node of the relay node may be UE, or may be another relay node. An NR in-band relay solution is referred to as integrated access and backhaul (IAB), and the relay node is referred to as an IAB node. The IAB node includes a terminal (mobile termination, MT) function and a distributed unit (DU) function. The MT is used by the IAB node to communicate with the upper-level node, and the DU is used by the IAB node to communicate with the lower-level node.

To dynamically coordinate broadband between the access link and the backhaul link, a two-level resource indication is used in NR IAB. Specifically, the two-level resource indication means that the upper-level node configures resources for the DU of the IAB node in an explicit or implicit manner, and there are at least two resource types: soft and hard. A hard resource indicates a resource that is always available to the DU of the IAB node, and availability of a soft resource depends on an indication of the upper-level node. The IAB node continues to perform resource indication on the lower-level node of the IAB node based on the resource indication of the upper-level node.

In some deployment scenarios, the DU of the IAB node may have a plurality of cells. Different DU cells may be sectors with different directions, or may be carriers of different frequency bands. Different DU cells may have different resource configuration, but currently, there is no resource indication method for a case in which a DU has a plurality of cells.

SUMMARY

Embodiments of this application provide a resource indication method and apparatus, to implement resource indication in a case in which a DU has a plurality of cells.

According to a first aspect, an embodiment of this application provides a resource indication method. The method includes: A first node receives indication information sent by a second node, where the indication information is used to indicate availability of a dynamic resource in first resources corresponding to P cells, the first resource is a transmission resource used by the first node to communicate with a third node, the second node is an upper-level node of the first node, and the third node is a lower-level node of the first node. The first node determines, in N included cells, the P cells indicated by the indication information, and determines the availability of the dynamic resource in the first resources of the P cells based on the indication information, where $1 \le P \le N$. In this embodiment of this application, the indication information sent by the second node may indicate availability of a dynamic resource in first resources of a plurality of cells, and the first node may determine a cell to which the indication information is applied, so that a manner of delivering the dynamic resource when there are a plurality of cells can be implemented. In addition, when there are a plurality of cells, the availability of the dynamic resource in the first resources can be accurately indicated.

In a possible design, when the first node determines, in the N included cells, the P cells indicated by the indication information, the first node may determine the P cells in the N cells according to a preset rule. In the foregoing design, a cell corresponding to the indication information is determined by using a rule specified in a protocol, so that the first node and the second node can determine the indication information according to the rule. In this way, when there are a plurality of cells, the availability of the dynamic resource in the first resources can be accurately indicated.

In a possible design, when the first node determines, in the N included cells, the P cells indicated by the indication information, the first node may receive first configuration information sent by the second node, where the first configuration information is used to determine the P cells. In the foregoing design, a cell to which the indication information is applied is configured by the second node for the first node, so that when there are a plurality of cells, the availability of the dynamic resource in the first resources can be accurately indicated.

In a possible design, the preset rule may be: grouping the N cells into a plurality of cell groups, where the P cells are one or more cells in a specified cell group of the plurality of cell groups. In the foregoing design, the first node and the second node may determine, by using a same rule, a cell to which the indication information is applied, so that when there are a plurality of cells, the availability of the dynamic resource in the first resources can be accurately indicated.

In a possible design, the preset rule may be: the P cells are one or more of cells whose corresponding first resources each have a specified resource multiplexing relationship with a second resource, where the second resource is a transmission resource used by the first node to communicate with the second node. In the foregoing design, the first node may not group cells, but may directly determine the P cells based on the resource multiplexing relationship, to reduce a delay and further save computing resources.

In a possible design, the preset rule may be: the P cells are one or more of cells that are coplanar/codirectional/co-located/quasi co-located with a mobile termination MT of the first node. In the foregoing design, the first node and the second node may determine that a cell to which the indication information is applied is one or more cells that are coplanar/codirectional/co-located/quasi co-located with the mobile termination MT of the first node, so that when there are a plurality of cells, the availability of the dynamic resource in the first resources can be accurately indicated.

In a possible design, the preset rule may be: grouping the N cells into a plurality of cell groups, where the P cells are cells included in a cell set, and the cell set includes one cell in each cell group. In the foregoing design, the indication information may indicate one cell in each cell group.

In a possible design, the preset rule may be: the P cells are the N cells. In the foregoing design, the indication information may indicate all cells of the first node.

In a possible design, the preset rule may be: the P cells are one or more of cells configured by using second configuration information obtained by the first node, where the second configuration information is used to perform resource configuration for the cell. The second node may configure resources of some cells for the first node. In the foregoing design, the indication information may indicate the some cells.

In a possible design, a manner of grouping the N cells into a plurality of cell groups is: grouping the N cells into a plurality of cell groups based on a resource multiplexing relationship between a corresponding first resource and a second resource. In the foregoing design, the indication information may perform indication for different resource multiplexing relationships.

In a possible design, the specified resource multiplexing relationship may be time division multiplexing.

In a possible design, the indication information may include M pieces of first sub-information, M is an integer greater than 0, and one piece of first sub-information is used to indicate the availability of the dynamic resource in the first resources of the P cells in one or more time units. In the foregoing design, one piece of first sub-information may indicate a plurality of cells, and signaling overheads can be reduced by using this joint indication method.

In a possible design, the indication information may include H pieces of second sub-information, H is an integer greater than 0, and the second sub-information is used to indicate availability of a dynamic resource in a first resource of one of the P cells in one or more time units. In the foregoing design, one piece of second sub-information may indicate one cell, and each cell can be accurately indicated by using this primary cell indication method.

In a possible design, the indication information may include K pieces of cell group indication information, one piece of cell group indication information corresponds to one cell group, each cell group includes at least one of the P cells, and the cell group indication information is used to indicate availability of a dynamic resource in a first resource of the cell group corresponding to the cell group indication information. In the foregoing design, one piece of cell group indication information may indicate one cell group, that is, may indicate a plurality of cells, and signaling overheads can be reduced by using a cell group-by-cell group indication method.

In a possible design, each piece of cell group indication information may include L pieces of third sub-information, L is an integer greater than 0, and the third sub-information is used to indicate, in one or more time units, availability of a dynamic resource in a first resource of a cell group corresponding to the cell group indication information in which the third sub-information is included. In the foregoing design, one piece of third sub-information may indicate a plurality of cells, and signaling overheads can be reduced by using this joint indication method.

In a possible design, each piece of cell group indication information may include J pieces of fourth sub-information, and the fourth sub-information is used to indicate, in one or more time units, availability of a dynamic resource in a first resource of a cell in a cell group corresponding to the cell group indication information in which the fourth sub-information is included. In the foregoing design, one piece of fourth sub-information may indicate one cell, and each cell can be accurately indicated by using this primary cell indication method.

In a possible design, after the first node determines the availability of the dynamic resource in the first resources of the P cells based on the indication information, the first node may determine availability of a dynamic resource in a first resource of another cell based on the availability of the first resources of the P cells, where the another cell includes one or more of cells other than the P cells in the N cells. In the design, the first node may determine availability of a dynamic resource in a first resource of another cell that is not indicated by the indication information.

According to a second aspect, this application provides a resource indication apparatus. The apparatus may be a first node, or may be a chip or a chip set in the first node. The apparatus may include a processing unit and a transceiver unit. When the apparatus is the first node, the processing unit may be a processor, and the transceiver unit may be a transceiver. The apparatus may further include a storage module. The storage module may be a memory, and the storage module is configured to store instructions. The processing unit executes the instructions stored in the storage module, so that the first node performs a corresponding function in the first aspect. When the apparatus is the chip or the chip set in the first node, the processing unit may be a processor, the transceiver unit may be an input/output interface, a pin, a circuit, or the like. The processing unit executes instructions stored in the storage module, so that the first node performs a corresponding function in the first aspect. The storage module may be a storage module (for example, a register or a cache) in the chip or the chip set, or may be a storage module (for example, a read-only memory or a random access memory) outside the chip or the chip set in the network device.

According to a third aspect, a resource indication apparatus is provided, and includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the resource indication method in any one of the first aspect or the designs of the first aspect.

According to a fourth aspect, this application further provides a computer-readable storage medium. The computer-readable storage medium stores instructions. When the instructions are run on a computer, the computer is enabled to perform the resource indication method in any one of the first aspect or the designs of the first aspect.

According to a fifth aspect, this application further provides a computer program product including instructions. When the computer program product runs on a computer, the computer is enabled to perform the resource indication method in any one of the first aspect or the designs of the first aspect.

According to a sixth aspect, this application further provides a network system. The network system includes a first node and a second node, and the first node is the apparatus in the second aspect or the third aspect.

According to a seventh aspect, an embodiment of this application provides a chip. The chip is coupled to a memory, to perform the method in any one of the first aspect and the possible designs of the first aspect in the embodiments of this application.

In addition, for technical effects brought by the second aspect to the fifth aspect, refer to the descriptions in the first aspect. Details are not described herein again.

It should be noted that "coupling" in the embodiments of this application indicates a direct combination or an indirect combination between two components.

BRIEF DESCRIPTION OF DRAWINGS

FIG. 7 is a schematic diagram of a method for configuring a backhaul resource according to an embodiment of this application;

FIG. 14 is a schematic diagram of H/S resources of two cells according to an embodiment of this application;

FIG. 15 is a schematic diagram of joint indication according to an embodiment of this application;

FIG. 16 is a schematic diagram of cell-by-cell indication according to an embodiment of this application;

DESCRIPTION OF EMBODIMENTS

The following describes technical solutions in this application with reference to the accompanying drawings.

Names of all nodes and messages in this application are merely names that are set for ease of description, and names in an actual network may be different. It should not be understood that names of various nodes and messages are limited in this application. On the contrary, any name having a function the same as or similar to that of a node or a message used in this application is considered as a method or an equivalent replacement of this application, and shall fall within the protection scope of this application. Details are not described below.

A communication system mentioned in embodiments of this application includes, but is not limited to, a narrowband Internet of Things (NB-IoT) system, a wireless local area network (WLAN) system, a long term evolution (LTE) system, a 5th generation mobile communication (5th generation mobile networks, or 5th generation wireless systems, or 5G), or a communication system after 5G, for example, a new radio (NR) system or a device to device (D2D) communication system.

Figure 1:
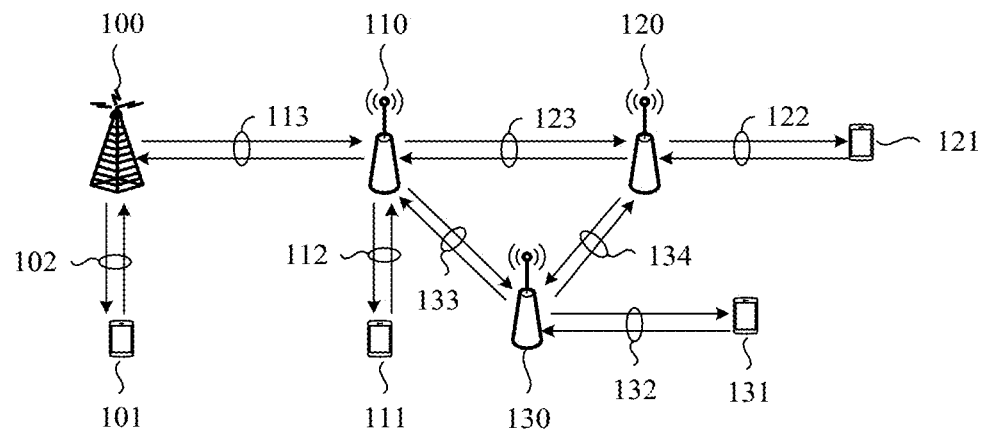
FIG. 1 is a schematic architectural diagram of an IAB system according to an embodiment of this application.

To better understand the embodiments of the present disclosure, a network architecture used in the embodiments of the present disclosure is first described in the following. FIG. 1 is a schematic diagram of a structure of a communication system to which an embodiment of this application is applicable.

FIG. 1 is an architectural diagram of an integrated access and backhaul (IAB) system applicable to the technical solutions of this application. As shown in FIG. 1, an IAB system includes at least: one base station 100, one or more terminal devices (terminals) 101 served by the base station 100, one or more relay nodes (namely, IAB nodes) 110, and one or more terminal devices 111 served by the IAB nodes 110. Generally, the base station 100 is referred to as a donor base station (donor next generation NodeB, DgNB), and the IAB node 110 is connected to the base station 100 through a wireless backhaul link 113. The donor base station is also referred to as a donor node in this application, that is, a donor node.

The base station 100 includes, but is not limited to, an evolved NodeB (evolved node base, eNB), a radio network controller (RNC), a NodeB (NB), a base station controller (BSC), a base transceiver station (BTS), a home NodeB (home evolved NodeB, or home NodeB, or HNB), a baseband unit (BBU), an evolved (evolved LTE, eLTE) base station, an NR base station (next generation NodeB, gNB), and the like.

The terminal device includes, but is not limited to, any one of a user equipment (UE), a mobile console, an access terminal, a subscriber unit, a subscriber station, a mobile station, a remote station, a remote terminal, a mobile device, a terminal, a wireless communication device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile console in a future 5G network, and a terminal device in a future evolved public land mobile network (PLMN) network. The IAB node is a specific name of the relay node, and does not constitute a limitation on the solutions in this application. The IAB node may be the foregoing base station or terminal device having a forwarding function, or may be in an independent device form. For example, the IAB node in this application may also be referred to as a relay node (RN), a transmission reception point, a relay transmission reception point (relaying TRP), or the like.

The IAB system may further include a plurality of other IAB nodes, for example, an IAB node 120 and an IAB node 130. The IAB node 120 is connected to the IAB node 110 through a wireless backhaul link 123, to access a network. The IAB node 130 is connected to the IAB node 110 through a wireless backhaul link 133, to access the network. The IAB node 120 serves one or more terminal devices 121, and the IAB node 130 serves one or more terminal devices 131. In FIG. 1, both the IAB node 110 and the IAB node 120 are connected to the network through a wireless backhaul link. In this application, the wireless backhaul link is viewed from a perspective of the relay node. For example, the wireless backhaul link 113 is a backhaul link of the IAB node 110, and the wireless backhaul link 123 is a backhaul link of the IAB node 120. As shown in FIG. 1, one IAB node, for example, the IAB node 120, may be connected to another IAB node 110 through a wireless backhaul link, for example, the wireless backhaul link 123, to be connected to the network. In addition, the relay node may be connected to the network through a plurality of wireless relay nodes. It should be understood that, in this application, the IAB node is used only for a purpose of description, and does not indicate that the solutions of this application are used only in an NR scenario. In this application, the IAB node may be any node or device that has a relay function. It should be understood that use of the IAB node and use of the relay node in this application have a same meaning.

In addition, the following basic terms or concepts are further involved in this application.

An access link is a link between UE and an IAB node or an IAB donor node. Alternatively, the access link includes a wireless link used when a node communicates with a lower-level node of the node. The access link includes an uplink access link and a downlink access link. The uplink access link is also referred to as uplink transmission of the access link, and the downlink access link is also referred to as downlink transmission of the access link.

A backhaul link is a link between an IAB node and an IAB child node or an IAB parent node. The backhaul link includes a link for downlink transmission with the IAB child node or the IAB parent node, and a link for uplink transmission with the IAB child node or the IAB parent node. For the IAB node, transmitting data to the IAB parent node or receiving uplink data transmitted by the IAB child node is referred to as uplink transmission of the backhaul link. For the IAB node, receiving data transmitted by the IAB parent node or transmitting data to the IAB child node is referred to as downlink transmission of the backhaul link. To distinguish between the UE and the IAB node, the backhaul link between the IAB node and the IAB parent node is also referred to as a parent backhaul link (parent BH), and the backhaul link between the IAB node and the IAB child node is referred to as a child backhaul link (child BH).

In some cases, a child backhaul link and an access link of the IAB node are collectively referred to as an access link, that is, a lower-level node is considered as a terminal device of an upper-level node. It should be understood that, in the integrated access and backhaul system shown in FIG. 1, one IAB node is connected to one upper-level node. However, in a future relay system, to improve reliability of the wireless backhaul link, one IAB node, for example, the IAB node 120, may be simultaneously served by a plurality of upper-level nodes. For example, the IAB node 130 in FIG. 1 may further be connected to the IAB node 120 through a backhaul link 134, that is, both the IAB node 110 and the IAB node 120 are considered as upper-level nodes of the IAB node 130. Names of the IAB nodes 110, 120, and 130 do not limit a deployment scenario or network thereof, and may be any other name such as a relay or an RN. In this application, the IAB node is used only for ease of description.

In FIG. 1, the wireless links 102, 112, 122, 132, 113, 123, 133, and 134 may each be a bidirectional link, and include uplink and downlink transmission links. Particularly, the wireless backhaul links 113, 123, 133, and 134 may be used by the upper-level node to serve the lower-level node. For example, an upper-level node 100 provides a wireless backhaul service for a lower-level node 110. It should be understood that an uplink and a downlink of a backhaul link may be separated, that is, uplink transmission and downlink transmission are not performed through a same node. The downlink transmission means that an upper-level node, for example, the node 100, transmits information or data to a lower-level node, for example, the node 110, and the uplink transmission means that a lower-level node, for example, the node 110, transmits information or data to an upper-level node, for example, the node 100. The node is not limited to a network node or a terminal device. For example, in a D2D scenario, the terminal device may act as a relay node to serve another terminal device. In some scenarios, a wireless backhaul link may alternatively be an access link. For example, the backhaul link 123 may also be considered as an access link for the node 110, and the backhaul link 113 is also an access link of the node 100. It should be understood that the upper-level node may be a base station or a relay node, and the lower-level node may be a relay node or a terminal device having a relay function. For example, in the D2D scenario, the lower-level node may alternatively be a terminal device.

Figure 2:
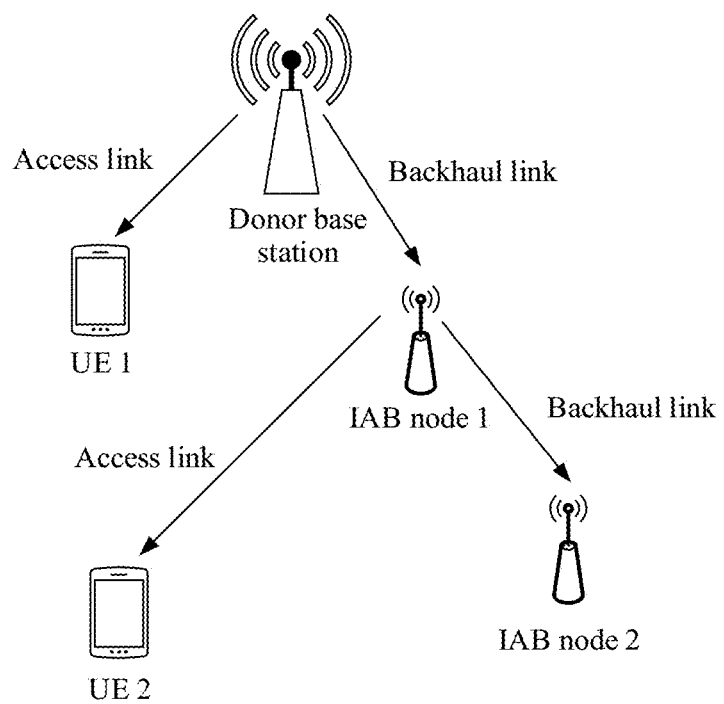
FIG. 2 is a specific schematic diagram of an IAB system according to an embodiment of this application.

FIG. 2 shows a specific example of an IAB system. The IAB system shown in FIG. 2 includes a donor base station, an IAB node 1, an IAB node 2, UE 1, and UE 2. A link between the donor base station and the IAB node 1, and a link between the IAB node 1 and the IAB node 2 are backhaul links. A link between the UE 1 and the donor base station and a link between the UE 2 and the IAB node 1 are access links.

Figure 3:
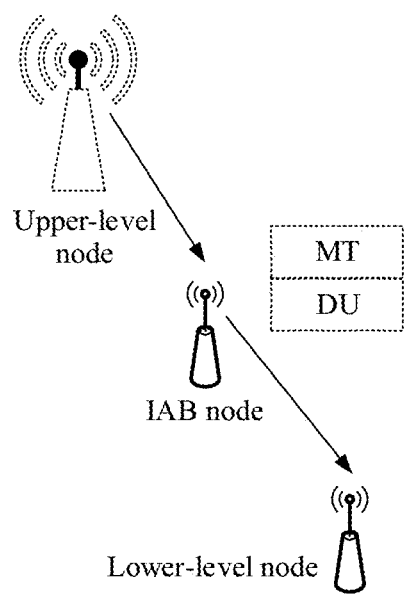
FIG. 3 is a schematic diagram of a structure of an IAB node according to an embodiment of this application.

FIG. 3 is a schematic diagram of a structure of an IAB node. As shown in FIG. 3, a mobile termination (MT) function is defined as a component similar to UE. In IAB, the MT is referred to as a function (or a module) that camps on the IAB node. Because the MT is similar to a function of common UE, it may be considered that the IAB node accesses an upper-level node or a network through the MT. A distributed unit (DU) function is defined as a component similar to a base station. In IAB, the DU is referred to as a function (or a module) that camps on the IAB node. Because the DU is similar to a function or a part of a function of a common base station, it may be considered that the IAB node may allow access of a lower-level node and a terminal device through the DU.

Figure 4:
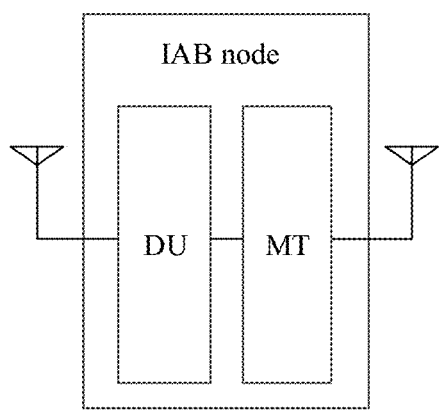
FIG. 4 is a schematic diagram of a structure of an IAB node according to an embodiment of this application.

The MT and the DU of the IAB node both have complete transceiver units, and there is an interface between the MT and the DU. However, it should be noted that the MT and the DU are logical modules. In practice, the MT and the DU may share some sub-modules, for example, may share a transceiver antenna and a baseband processing unit, as shown in FIG. 4.

Figure 5:
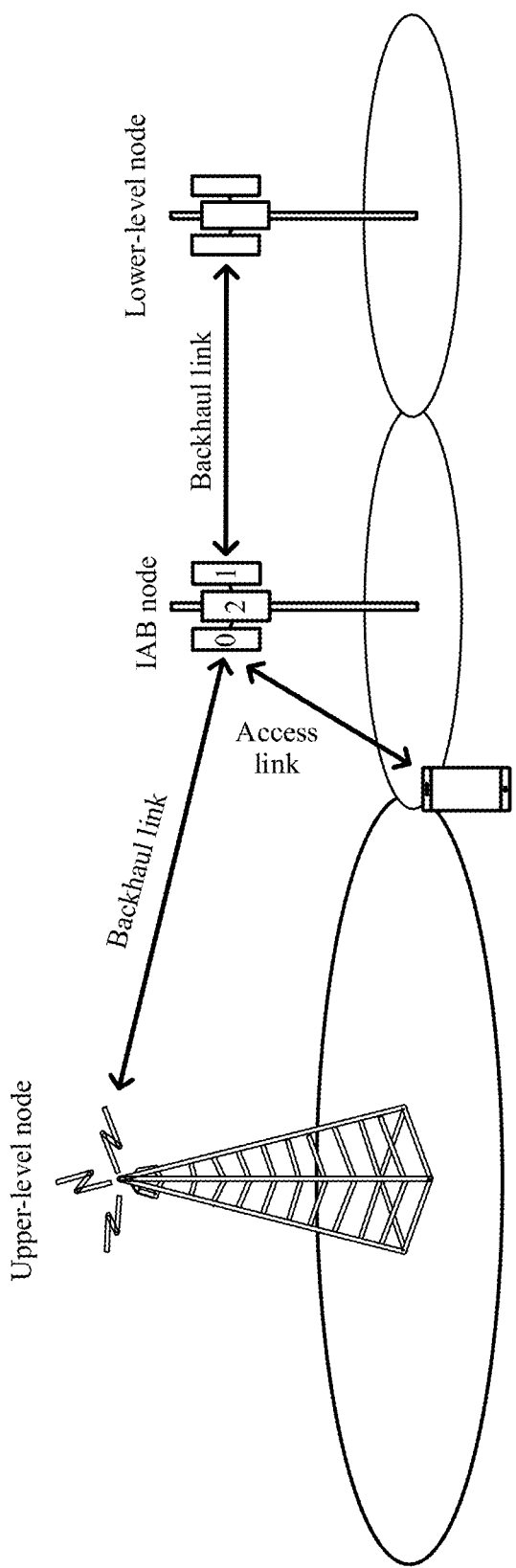
FIG. 5 is a schematic diagram of a DU having a plurality of cells according to an embodiment of this application.

Further, the DU may have a plurality of sub-modules. For example, the DU may have a plurality of cells, as shown in FIG. 5.

Figure 6:
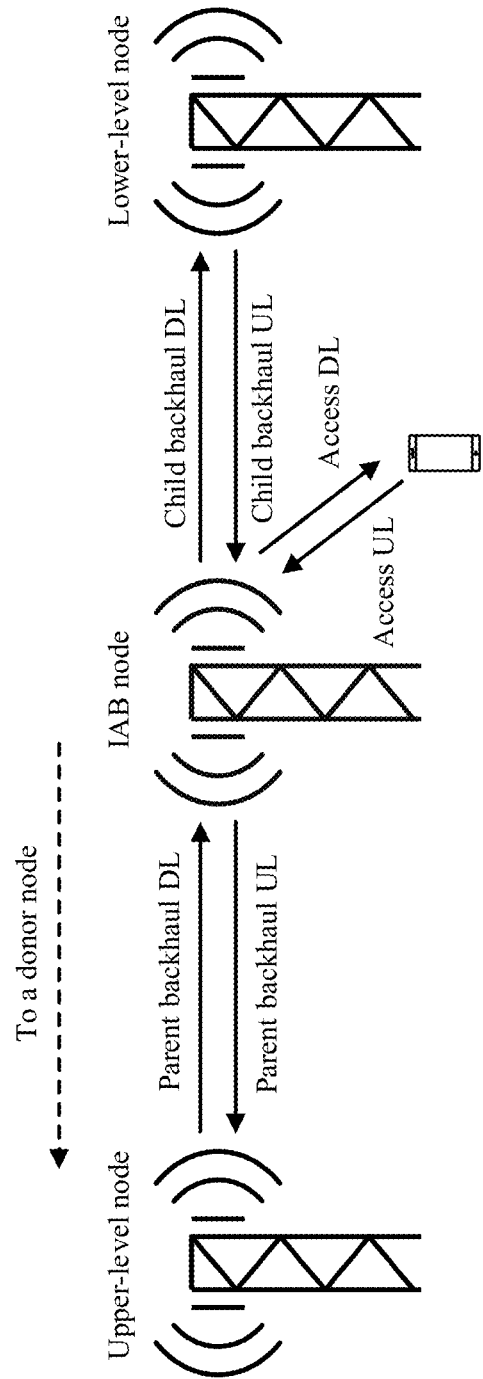
FIG. 6 is a schematic diagram of an access link and a backhaul link according to an embodiment of this application.

A link used by the MT to communicate with the upper-level node is referred to as a parent backhaul link (parent BH link), a link used by the DU to communicate with a lower-level IAB node is referred to as a child backhaul link (child BH link), and a link used by the DU to communicate with UE served by the DU is referred to as an access link. The parent backhaul link includes a parent backhaul uplink (UL) and a parent backhaul downlink (DL), the child backhaul link includes a child backhaul UL and a child backhaul DL, and the access link includes an access UL and an access DL, as shown in FIG. 6. In some cases, the child backhaul link is also referred to as an access link.

The following describes a method for configuring a backhaul resource in an LTE relay system with reference to FIG. 7.

In the LTE relay system, a donor node semi-statically configures the backhaul resource for a relay node. FIG. 7 shows a specific example of allocation of a downlink backhaul resource in the LTE relay system. In LTE, the donor node allocates the backhaul link resource to the relay node in a unit of subframe (1 ms), and an allocation periodicity is one radio frame (10 ms). Specifically, the donor node designates some subframes as backhaul link subframes by using radio resource control (RRC) signaling. A quantity of and locations of backhaul link subframes may be reconfigured.

For the relay node in LTE, when a subframe is configured as a backhaul subframe, the relay node needs to monitor a relay physical downlink control channel (R-PDCCH) and/or receive a physical downlink shared channel (PDSCH) in the subframe. Therefore, sending cannot be performed on an access link. As shown in FIG. 7, if subframes 2, 4, and 6 are configured as backhaul links, subframes 2, 4, and 6 on a corresponding access link are null. Therefore, LTE relaying is allocating a semi-static time division multiplexing (TDM) resource.

The following describes a resource allocation method in an IAB system in NR.

Figure 8:
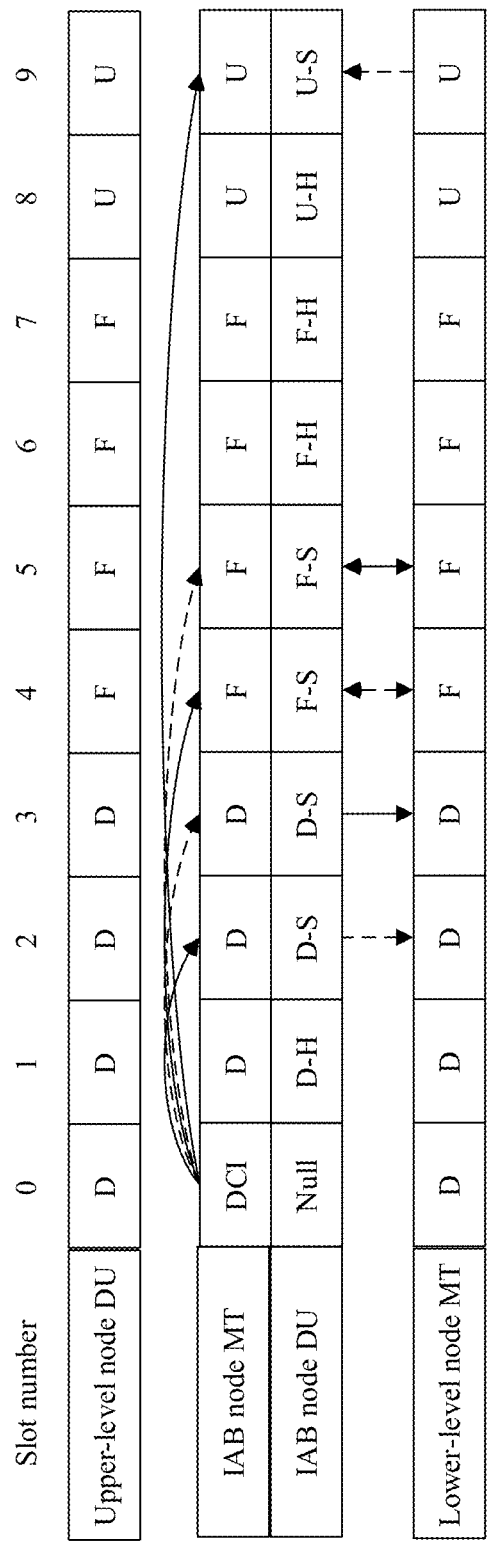
FIG. 8 is a schematic diagram of an example of resource configuration of an IAB node in NR according to an embodiment of this application.

FIG. 8 is a schematic diagram of an example of resource configuration of an IAB node in NR. MT resources of the IAB node may be configured as three types: downlink (D), uplink (U), and flexible (F). The three types are also supported by an existing terminal device, and therefore may be indicated by using existing signaling.

DU resources of the IAB node may be configured as four types: downlink, uplink, flexible, and null (N). Further, the three types of DU resources: downlink, uplink, and flexible may be further classified into hard (H) resources and soft (S) resources. A hard resource of a DU indicates a resource that is always available to the DU.

A soft resource of the DU indicates that whether a resource is available to the DU needs to depend on an indication of an upper-level node (for example, a donor node).

It can be learned from the foregoing that resource allocation on the DU of the IAB node in NR depends on the indication of the upper-level node, and DU resource indication is performed in a manner of semi-static allocation and dynamic indication. This resource allocation manner is greatly different from a resource allocation method in an LTE system.

With reference to FIG. 3 and FIG. 8, the MT of the IAB node is connected to a DU of the upper-level node, and the DU of the IAB node is connected to an MT of the lower-level node. After resource configuration is performed in a semi-static manner (for example, by using RRC signaling and/or F1-AP interface signaling), the IAB node may obtain resource configuration of the MT resource and the DU resource of the IAB node. For example, the resource configuration may include transmission directions (D/U/F) of the MT resource and the DU resource, a type (soft/hard) of the DU resource, and a location of a NULL resource of the DU. It should be understood that the foregoing related configuration may be obtained by using explicit signaling, or may be obtained in an implicit manner. Specifically, FIG. 7 is a schematic diagram of resource configuration of an MT and a DU in a time division multiplexing case.

With reference to FIG. 8 and the following Table 1, it can be learned that for the IAB node, MT resources (for example, MT resources corresponding to the first slot, the sixth slot, the seventh slot, and the eighth slot) corresponding to hard resources (for example, DU resources corresponding to the first slot, the sixth slot, the seventh slot, and the eighth slot) of the DU are null.

Specifically, the MT of the IAB node has three types of resources in total, and the DU of the IAB node has seven types of resources in total. After every two types of resources are combined, possible behavior of the MT of the IAB node and the corresponding DU is shown in the following two tables. Table 1 shows resource configuration of the MT and the DU in a time division multiplexing scenario in various possible combinations of resource types. Table 2 shows resource configuration of the MT and the DU in a spatial division multiplexing (SDM) scenario in various possible combinations of resource types.

TABLE 1

| DU resource type | MT resource type | | |
|---|---|---|---|
| | D | U | F |
| D-H | DU: Tx<br>MT: NULL | DU: Tx<br>MT: NULL | DU: Tx<br>MT: NULL |
| D-S | When a DU resource: IA<br>DU: Tx<br>MT: NULL<br>When a DU resource: INA<br>DU: NULL<br>MT: Rx | When a DU resource: IA<br>DU: Tx<br>MT: NULL<br>When a DU resource: INA<br>DU: NULL<br>MT: Tx | When a DU resource: IA<br>DU: Tx<br>MT: NULL<br>When a DU resource: INA<br>DU: NULL<br>MT: Tx/Rx |
| U-H | DU: Rx<br>MT: NULL | DU: Rx<br>MT: NULL | DU: Rx<br>MT: NULL |
| U-S | When a DU resource: IA<br>DU: Rx<br>MT: NULL<br>When a DU resource: INA<br>DU: NULL<br>MT: Rx | When a DU resource: IA<br>DU: Rx<br>MT: NULL<br>When a DU resource: INA<br>DU: NULL<br>MT: Tx | When a DU resource: IA<br>DU: Rx<br>MT: NULL<br>When a DU resource: INA<br>DU: NULL<br>MT: Tx/Rx |

TABLE 1-continued

| DU resource type | MT resource type | | |
|---|---|---|---|
| | D | U | F |
| F-H | DU: Tx/Rx<br>MT: NULL | DU: Tx/Rx<br>MT: NULL | DU: Tx/Rx<br>MT: NULL |
| F-S | When a DU resource: IA<br>DU: Tx/Rx<br>MT: NULL<br>When a DU resource: INA<br>DU: NULL<br>MT: Rx | When a DU resource: IA<br>DU: Tx/Rx<br>MT: NULL<br>When a DU resource: INA<br>DU: NULL<br>MT: Tx | When a DU resource: IA<br>DU: Tx/Rx<br>MT: NULL<br>When a DU resource: INA<br>DU: NULL<br>MT: Tx/Rx |
| NULL | DU: NULL<br>MT: Rx | DU: NULL<br>MT: Tx | DU: NULL<br>MT: Tx/Rx |

TABLE 2

| DU resource type | MT resource type | | |
|---|---|---|---|
| | DL | UL | F |
| DL-H | DU: Tx<br>MT: NULL | DU: Tx<br>MT: Tx | DU: Tx<br>MT: Tx |
| DL-S | When a DU resource: IA<br>DU: Tx<br>MT: NULL<br>When a DU resource: INA<br>DU: NULL<br>MT: Rx | When a DU resource: IA<br>DU: Tx<br>MT: Tx<br>When a DU resource: INA<br>DU: NULL<br>MT: Tx | When a DU resource: IA<br>DU: Tx<br>MT: Tx<br>When a DU resource: INA<br>DU: NULL<br>MT: Tx/Rx |
| UL-H | DU: Rx<br>MT: Rx | DU: Rx<br>MT: NULL | DU: Rx<br>MT: Rx |
| UL-S | When a DU resource: IA<br>DU: Rx<br>MT: Rx<br>When a DU resource: INA<br>DU: NULL<br>MT: Rx | When a DU resource: IA<br>DU: Rx<br>MT: NULL<br>When a DU resource: INA<br>DU: NULL<br>MT: Tx | When a DU resource: IA<br>DU: Rx (only when an IAB-DU learns in advance that an IAB-MT is in an Rx state)<br>MT: Rx<br>When a DU resource: INA<br>DU: NULL<br>MT: Tx/Rx |
| F-H | DU: Tx/Rx<br>MT: Rx (only when an upper-level node learns in advance that an IAB-DU is in an Rx state) | DU: Tx/Rx<br>MT: Tx (only when an upper-level node learns in advance that an IAB-DU is in a Tx state) | DU: Tx/Rx<br>MT: Tx (only when a DU of an upper-level node learns in advance that an IAB-DU is in a Tx state), or Rx (only when the DU of the upper-level node learns in advance that the IAB-DU is in an Rx state) |
| F-S | When a DU resource: IA<br>DU: Tx/Rx<br>MT: Rx (only when an upper-level node learns in advance that an IAB-DU is in an Rx state)<br>When a DU resource: INA<br>DU: NULL<br>MT: Rx | When a DU resource: IA<br>DU: Tx/Rx<br>MT: Tx (only when an upper-level node learns in advance that an IAB-DU is in a Tx state)<br>When a DU resource: INA<br>DU: NULL<br>MT: Tx | When a DU resource: IA<br>DU: Tx/Rx<br>MT: Tx (only when a DU of an upper-level node learns in advance that an IAB-DU is in a Tx state), or Rx (only when the DU of the upper-level node learns in advance that the IAB-DU is in an Rx state)<br>When a DU resource: INA<br>DU: NULL<br>MT: Tx/Rx |
| NA | DU: NULL<br>MT: Rx | DU: NULL<br>MT: Tx | DU: NULL<br>MT: Tx/Rx |

Meanings of various identifiers in the foregoing Table 1 and Table 2 are as follows:

"MT: Tx" indicates that the MT should perform transmission after being scheduled.

"DU: Tx" indicates that the DU can perform transmission.

"MT: Rx" indicates that the MT is capable of performing reception (if a signal needs to be received).

"DU: Rx" indicates that the DU can schedule uplink transmission of the lower-level node.

"MT: Tx/Rx" indicates that the MT should perform transmission or reception after being scheduled, but the transmission and reception do not occur simultaneously.

"DU: Tx/Rx" indicates that the DU can perform transmission or receive transmission from the lower-level node, but the transmission and reception do not occur simultaneously.

"IA" indicates that the DU resource is explicitly or implicitly indicated as available.

"INA" indicates that the DU resource is explicitly or implicitly indicated as null.

"MT: NULL" indicates that the MT does not perform sending and does not need to have a reception capability.

"DU: NULL" indicates that the DU does not perform sending and does not receive transmission from the lower-level node.

To dynamically coordinate resources between the access link and the backhaul link, a two-level resource indication is used in NR IAB. Specifically, the two-level resource indication means that the upper-level node configures the soft resource and the hard resource for the DU of the IAB node in an explicit or implicit manner. However, availability of the soft resource depends on a dynamic signaling indication of the upper-level node.

Figure 9:
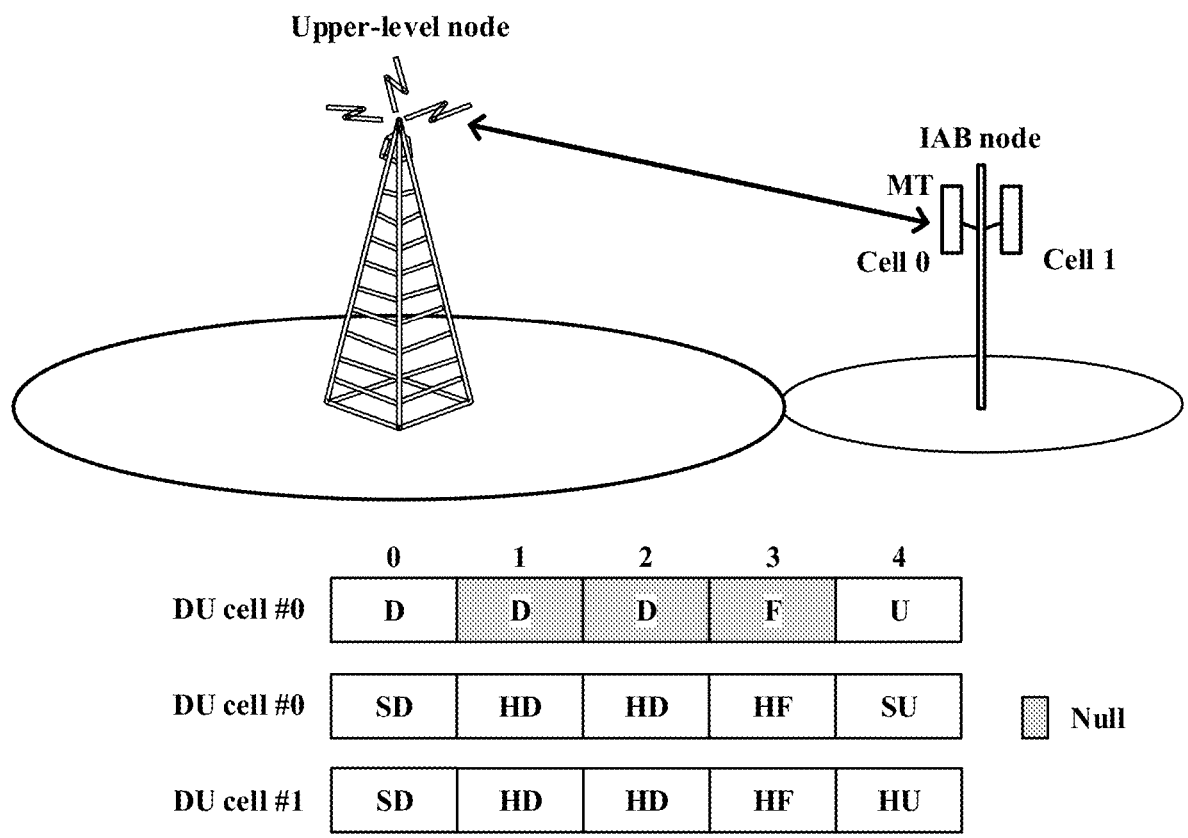
FIG. 9 is a schematic diagram of a relationship between each of DU resources of a plurality of cells and an MT resource according to an embodiment of this application.

In a case in which the DU has a plurality of cells, different cells of the DU may have different H/S types. For example, it is assumed that the DU has two cells, namely, a cell #0 and a cell #1, where the cell #0 shares an antenna panel with the MT, or is in the same direction as the antenna panel of the MT. Five time domain resources (slots) are considered. A slot 0 is a downlink resource of the MT and a downlink soft resource of either of the two cells; slots 1 to 3 are null for the MT, the slot 1 and the slot 2 each are a downlink hard resource of either of the two cells, and the slot 3 is a flexible uplink and downlink hard resource of either of the two cells; a slot 4 is an uplink resource of the MT, a soft resource of the cell #0, and a hard resource of the cell #1, as shown in FIG. 9. A reason why the two cells of the DU may have different H/S types in the slot 4 is that a transmission direction of the cell #1 is opposite to a transmission direction of the MT in the slot, and transmission (sending) does not violate the half-duplex constraint (that is, the MT and the DU cannot perform reception and transmission simultaneously). In addition, the panel of the MT is opposite to that of the cell #1, and the two panels have little impact on each other.

For a case in which a DU has a plurality of modules, embodiments of this application provide a resource indication method and apparatus. The method and the apparatus are based on a same concept. Because a problem-resolving principle of the method is similar to that of the apparatus, mutual reference may be made to implementations of the apparatus and the method. Repeated parts are not described in detail.

The resource indication method provided in the embodiments of this application may be applied to the communication system shown in FIG. 1. It should be understood that FIG. 1 is merely an example for description, and does not specifically limit a quantity of terminal devices and network devices included in the communication system.

It should be understood that, in the embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one (piece) of the following" or a similar expression thereof means any combination of these items, including any combination of singular items (pieces) or plural items (pieces). For example, at least one (piece) of a, b, or c may indicate a, b, c, a and b, a and c, b and c, or a, b, and c, where a, b, and c may be singular or plural.

In addition, it should be understood that in descriptions of this application, terms such as "first" and "second" are merely intended for purposes of description, and should not be understood as an indication or implication of relative importance, and cannot be understood as an indication or implication of a sequence.

The following describes in detail the resource indication method provided in the embodiments of this application with reference to the accompanying drawings.

Figure 10:
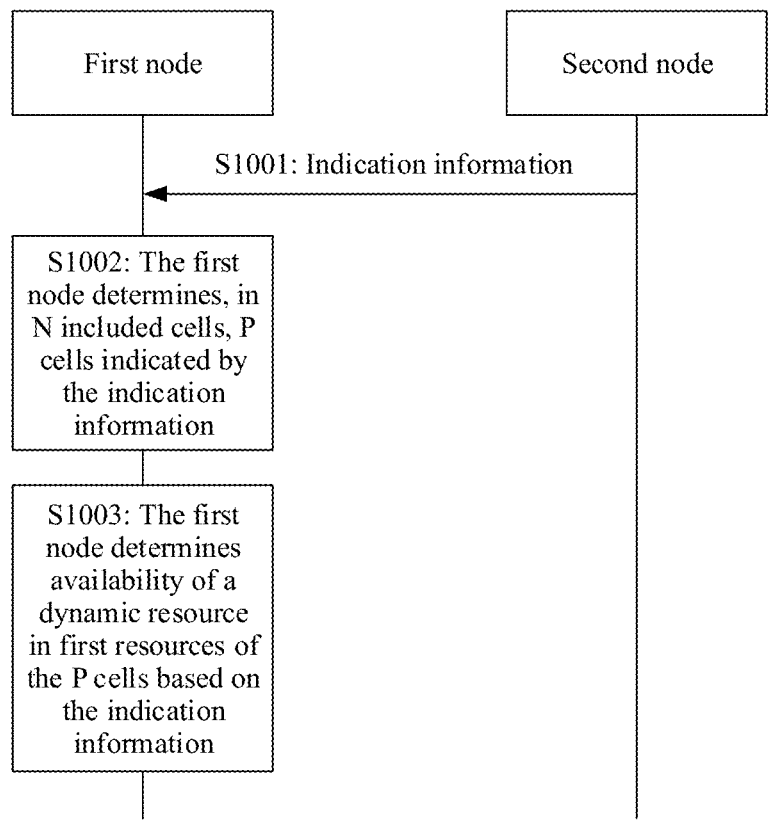
FIG. 10 is a flowchart of a resource indication method according to an embodiment of this application.

FIG. 10 is a flowchart of a resource indication method according to this application. The method includes the following steps.

S1001: A second node sends indication information to a first node. Correspondingly, the first node receives the indication information sent by the second node, where the indication information is used to indicate availability of a dynamic resource in first resources corresponding to P cells, the first resource is a transmission resource used by the first node to communicate with a third node, the second node is an upper-level node (a donor node or a parent node) of the first node, and the third node is a lower-level node (or a child node) of the first node.

Specifically, the indication information may be received by an MT of the first node.

Figure 11:
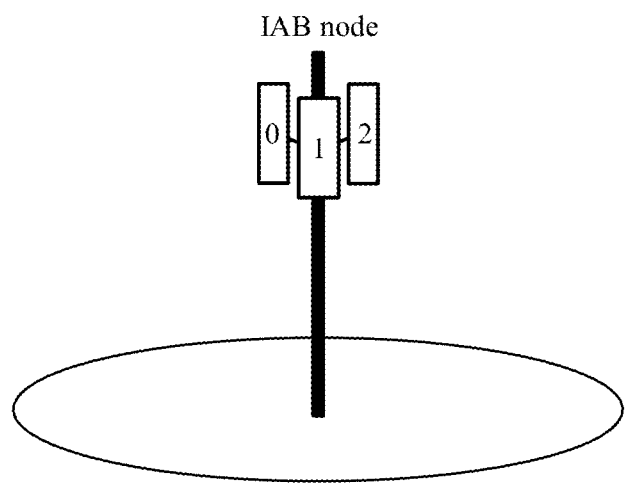
FIG. 11 is a schematic diagram of a DU having a plurality of cells according to an embodiment of this application.
Figure 12:
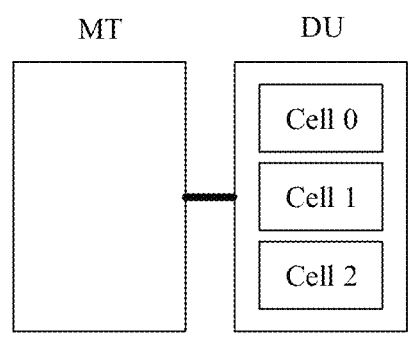
FIG. 12 is a schematic diagram of a logical structure including a DU having a plurality of cells and an MT according to an embodiment of this application.

In this embodiment of this application, a DU of the first node may have (include, correspond to, or cover) a plurality of cells. For example, the DU of the first node has panels or sectors with a plurality of directions, and different panels are different cells, as shown in FIG. 11; or carrier aggregation is used for the DU of the first node, and different carriers are different cells. It should be understood that another scenario in which a DU has a plurality of cells is not excluded in this application. For example, a logical structure including an MT and a DU having a plurality of cells may be that shown in FIG. 12. Different cells of the DU may have different physical cell identifiers (physical-layer cell identities, PCIs), or may share a same PCI.

It should be noted that in this embodiment of this application, only the cell is used as an example for description, but the cell being used as a unit is not limited. During specific implementation, another sub-module or sub-unit may be used as a unit, for example, a sector or an antenna panel. For example, when the sector is used as a unit, the indication information may indicate availability of a dynamic resource in first resources corresponding to P sectors.

The second node may be a common network device, such as a base station, or may be a relay device or an IAB node.

The third node may be a common network device, such as a base station, or may be a relay device, an IAB node, or a terminal device.

The indication information may be carried by using layer 1 dynamic signaling or layer 2 signaling, for example, downlink control information (DCI) or a MAC CE.

The indication information may also be referred to as dynamic signaling, dynamic indication signaling, dynamic DCI, indication DCI, or the like.

S1002: The first node determines, in N included (existing, corresponding, or covered) cells, the P cells indicated by the indication information, where 1≤P≤N.

When the DU of the first node has (includes, covers, or corresponds to) a plurality of cells, the first node needs to determine a cell to which the indication DCI is applied. For example, the indication information may indicate first resources of all cells (that is, P is equal to N, and the P cells are all of the N cells), or may only indicate first resources of some cells (that is, P is less than N, and the P cells are some of the N cells).

S1003: The first node determines the availability of the dynamic resource in the first resources of the P cells based on the indication information.

Figure 13:
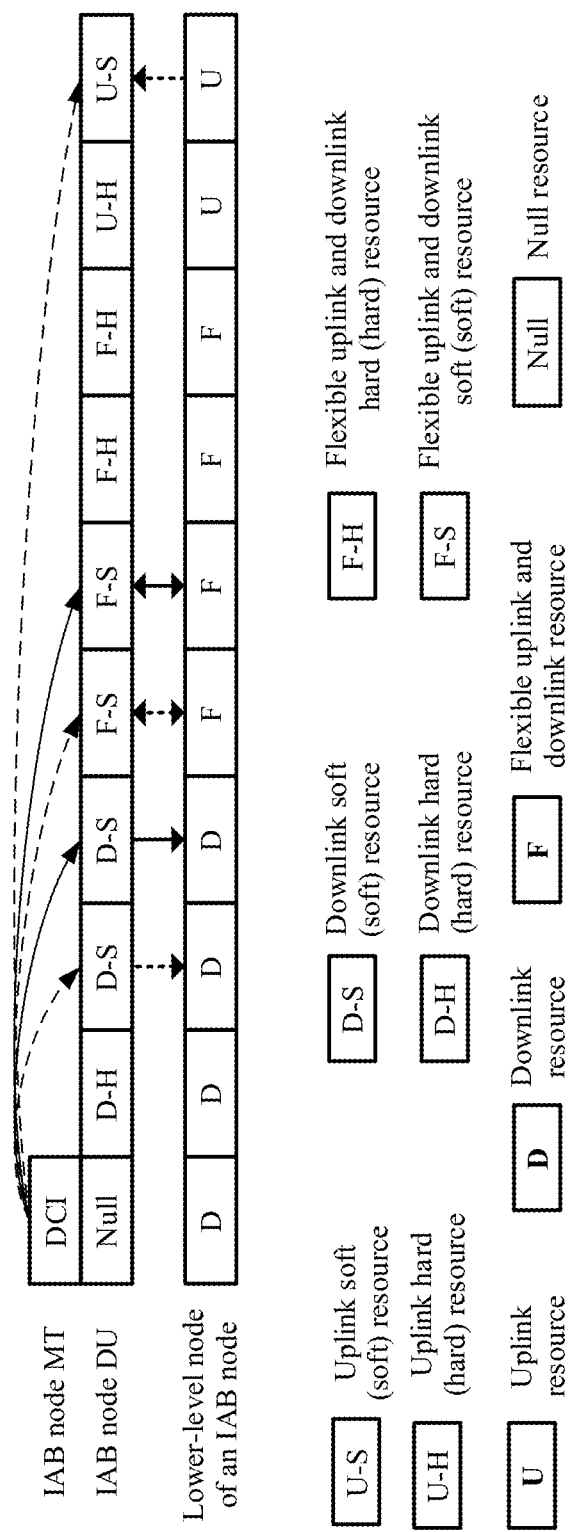
FIG. 13 is a schematic diagram of indicating a DU soft resource according to an embodiment of this application.

As shown in FIG. 13, if the indication information indicates that a dynamic resource in a first resource of a cell is available (the solid line in the figure), the first node may use a corresponding resource to communicate with the third node. If the indication information indicates that a dynamic resource in a first resource of a cell is null (the dashed line in the figure), the first node cannot use a corresponding resource to communicate with the third node.

During specific implementation, the first node may infer availability of a second resource of the first node based on an indication of the indication information on the dynamic resource in the first resource. The second resource is a transmission resource used by the first node to communicate with the second node.

In this embodiment of this application, the indication DCI sent by the upper-level node of the IAB node may indicate DU resources of a plurality of cells, and the IAB node may determine a cell to which the indication DCI is applied, so that a manner of delivering a dynamic resource when the DU has a plurality of cells can be implemented. In addition, it can be ensured that when the DU has a plurality of cells, availability of a soft resource of the DU can be accurately indicated.

For ease of description, in the following, the first node is referred to as the IAB node, the second node is referred to as the upper-level node of the IAB node, the third node is the lower-level node of the IAB node, and the indication information sent by the second node is referred to as the indication DCI.

The transmission resource (namely, the first resource) used by the IAB node to communicate with the lower-level node of the IAB node may be a DU resource, and the dynamic resource in the first resource may be a soft resource in the DU resource. The transmission resource (namely, the second resource) used by the IAB node to communicate with the upper-level node of the IAB node may be an MT resource. For ease of description, in the following, the first resource is referred to as the DU resource, the dynamic resource in the first resource is referred to as a DU soft resource, and the second resource is referred to as the MT resource. It should be noted that the DU resource, the DU soft resource, and the MT resource herein are merely example names, and may have other names in future communication development. For example, the transmission resource used by the IAB node to communicate with the lower-level node of the IAB node is named A, the dynamic resource in the first resource is named B, and the transmission resource used by the IAB node to communicate with the upper-level node of the IAB node is named C. It should be understood that if A can be used by the IAB node to communicate with the lower-level node of the IAB node, B is a resource in A and depends on an indication of the upper-level node (for example, the donor node). Alternatively, A may be understood as the first resource in this application, B may be understood as the dynamic resource in the first resource in this application, and C may be understood as the second resource in this application.

In an implementation, the IAB node may determine the P cells in the N cells according to a preset rule.

In an example description, the preset rule may be: grouping the N cells into a plurality of cell groups, where the P cells are one or more cells in a specified cell group of the plurality of cell groups.

A manner of grouping the N cells into a plurality of cell groups may be: grouping the N cells into a plurality of cell groups based on a resource multiplexing relationship between a DU corresponding to each cell and an MT.

For example, N cells of a DU of the IAB node may be grouped into M groups, and DU resources of all groups of cells have different resource multiplexing relationships with the MT resource. The resource multiplexing relationship herein may include but is not limited to time division multiplexing, spatial division multiplexing, frequency division multiplexing, full duplex, dynamic spatial division multiplexing, and the like. In an implementation, N=M, that is, no grouping is performed, or each group includes only one cell.

Generally, when the MT and a cell (or cell group) of the DU share an antenna panel (or antenna panels of the MT and the cell of the DU are codirectional), a resource multiplexing relationship between a DU resource of the cell (or cell group) and the MT resource may be time division multiplexing or dynamic spatial division multiplexing. However, when antenna panels used by the MT and a cell (or cell group) of the DU are different (or the antenna panels are oppositely oriented), a resource multiplexing relationship between the DU resource of the cell (or cell group) and the MT resource may be spatial division multiplexing or full duplex.

Further, an indicated cell group may be a cell group whose corresponding DU resource have a specified resource multiplexing relationship with the MT resource. For example, the specified resource multiplexing relationship may be time division multiplexing. That is, the IAB node groups the N cells into M groups based on a resource multiplexing relationship between a corresponding DU resource and the MT resource, and determines, in a cell group in which a DU resource of a cell has a time division multiplexing relationship with the MT resource, one or more cells as cells corresponding to the indication DCI.

In another example description, the preset rule may alternatively be: the P cells are one or more of cells whose corresponding DU resource each have a specified resource multiplexing relationship with the MT resource. For example, the specified resource multiplexing relationship may be time division multiplexing. In this manner, the IAB node may not group N cells of a DU of the IAB node, but may determine, based on a resource multiplexing relationship between a DU resource of each cell and the MT resource, a cell to which the indication DCI is applied.

In still another example description, the preset rule may alternatively be: the P cells are one or more of cells that are coplanar/codirectional/co-located/quasi co-located with the IAB node.

In yet another example description, the preset rule may alternatively be: grouping the N cells into a plurality of cell groups, where the P cells are cells included in a cell set, and the cell set includes one cell in each cell group. A manner of grouping the N cells into a plurality of cell groups may be: grouping the N cells into a plurality of cell groups based on a resource multiplexing relationship between a DU corresponding to each cell and an MT. In this case, the indication DCI may indicate one cell in each cell group.

In other example descriptions, the preset rule may be: the P cells are the N cells. In this case, cells corresponding to the indication DCI are all of the N cells. In an implementation, the indication DCI may separately indicate each cell, or may separately indicate a cell group after the P cells are grouped. A grouping manner may be grouping based on a resource multiplexing relationship between a DU corresponding to each cell and an MT, or may be grouping in another manner. This is not specifically limited herein.

The preset rule may alternatively be: the P cells are one or more of cells configured by using second configuration information obtained by the IAB node, where the second configuration information is used to perform resource configuration for the cell. A resource configured by using the second configuration information includes a hard/soft type of the DU resource.

During specific implementation, when configuring a soft/hard resource location for the IAB node, the donor node or the upper-level node of the IAB node may configure resource information to some cells, or only configure the resource information for each cell group. Resource types of the remaining cells may be the same as a resource type of the configured cell, or the IAB node infers the resource types of the remaining cells based on the resource type of the configured cell. When resource configuration is performed for each cell group of the DU, all the cell groups may have the same resource configuration.

When the donor node or the upper-level node of the IAB node only configures resource types of some cells, the cells to which the indication DCI is applied may be all or some of the configured cells.

For example, the DU of the IAB node has N cells, but the donor node or the upper-level node of the IAB node performs resource configuration on only P cells. The cells to which the indication DCI is applied may be the P cells.

In another implementation, the upper-level node of the IAB node may configure, for the IAB node by using signaling (for example, first configuration information), the P cells indicated by the indication DCI. Correspondingly, the IAB node may receive the first configuration information sent by the upper-level node of the IAB node, where the first configuration information is used to determine the P cells.

In some embodiments, the IAB node may first determine, according to a preset rule, P1 cells to which the indication DCI is applied, and then the upper-level node of the IAB node may reconfigure, for the IAB node by using signaling (for example, the first configuration information), P2 cells to which the indication DCI is applied. In this case, when the IAB node does not receive the first configuration information, the IAB node may determine that cells to which the indication DCI is applied are the P1 cells determined according to the preset rule, and after receiving the first configuration information, the IAB node may determine that cells to which the indication DCI is applied are the P2 cells configured by using the first configuration information.

During specific implementation, when the indication DCI indicates some of the N cells (that is, P is less than N), availability of a dynamic resource in DU resources of the remaining cells may be obtained in any one of the following manners:

Manner 1: There is an association relationship between a cell that is not indicated and an indicated cell, and DU soft resources of cells having the association relationship have same availability. The cell that is not indicated is a cell that is not included in the cells to which the indication DCI is applied, and the indicated cell is a cell included in the cells to which the indication DCI is applied.

Manner 2: The IAB node may determine availability of a DU soft resource of a cell that is not indicated.

Manner 3: The IAB node may determine, by scheduling signaling/semi-statically configuring a signal, availability of a DU soft resource of a cell that is not indicated.

In a possible implementation, a quantity of indicated DU cells may be limited, that is, a quantity of cells to which the indication DCI is applied may be limited. During specific implementation, a protocol may limit the quantity of cells to which the indication DCI is applied. For example, the quantity of indicated DU cells may be limited to 1, that is, the indication DCI being applied to only one cell is limited, and P=1. Therefore, the IAB node may determine one cell corresponding to the indication information in the N cells.

In this embodiment of this application, only H/S configuration of the DU resource is considered. H/S resources of the two cells may not completely overlap in time domain. As shown in FIG. 14, in a slot 2, a resource of a cell 1 is hard, and a resource of a cell 2 is soft; in a slot 4, the resource of the cell 1 is soft, and the resource of the cell 2 is hard.

In some embodiments, the indication DCI may perform indication in two manners: explicit indication and implicit indication. In the implicit indication manner, the indication information may be used to indicate whether an MT resource of the first node is released. In this manner, the second node may indicate whether the MT resource of the first node is released, so that the first node can infer availability of a DU soft resource of the first node based on the indication of the second node on the MT resource. In the explicit indication manner, the indication information may directly indicate whether a DU soft resource of the first node is available. In this manner, the second node may directly indicate availability of a DU soft resource of the first node. In addition, the indication information may further indicate a transmission direction of the DU soft resource, and the like.

In the explicit indication manner, the indication DCI may indicate availability of DU soft resources of the P cells in any one of the following three manners:

Manner 1: Joint indication. To be specific, one piece of first sub-information in the indication DCI may simultaneously indicate availability of DU soft resources of a plurality of cells, and soft resources of a plurality of DU cells indicated by the same first sub-information have same availability.

In the joint indication manner, the indication DCI may include M pieces of first sub-information, M is an integer greater than 0, and one piece of first sub-information is used to indicate availability of DU soft resources of the P cells in one or more time units.

For example, the time unit may be a slot, or may be a symbol.

In a possible implementation, the time unit may alternatively be a symbol set, for example, a downlink symbol set in one slot, an uplink symbol set in one slot, or a flexible symbol set in one slot. The flexible symbol set is determined based on an actual situation. This is not limited in this application.

The first sub-information may be considered as a bit string, or may be considered as a field. For ease of description, one piece of first sub-information in the indication DCI is referred to as a field in the indication DCI below.

In an implementation, one field may correspond to one time unit, a size of one field may be 1 bit, to indicate availability of a DU soft resource of each cell in a corresponding time unit.

In another implementation, one field may correspond to n time units, and n is an integer greater than 1. One field is used to indicate availability of DU soft resources of the P cells in n corresponding time units, and availability of DU soft resources of the P cells in different time units may be the same or may be different. For example, the time unit may be a symbol, and one field is used to indicate availability of DU soft resources of the P cells in n symbols of one slot.

In a possible implementation, one time unit may include a plurality of sub-time units. A resource corresponding to at least one of the P cells in only some sub-time units may be a soft resource, and resources corresponding to the P cells in another sub-time unit may be hard or Null. In this case, the indication DCI takes effect only on the sub-time unit in which a resource corresponding to a cell is a soft resource. For example, one slot includes 14 symbols. DU resources of one or more of the P cells in a symbol 0 and symbols 5 to 9 are soft resources, and DU resources of the P cells in symbols 1 to 4 and symbols 10 to 13 are not soft resources. In this case, the indication DCI is only used to indicate availability of DU soft resources of the P cells in the symbol 0 and the symbols 5 to 9.

In the implementation in which one field is used to indicate DU soft resources of the P cells in one time unit, for one time unit, provided that a DU resource of at least one cell in the time unit is a soft resource, the time unit needs to be indicated. In other words, the indication DCI includes a field corresponding to the time unit. In addition, regardless of how many DU resources of cells in the time unit are soft resources, one field is used for indication. In other words, the field corresponding to the time unit may simultaneously indicate availability of DU soft resources of a plurality of cells. It is assumed that the time unit is a slot. As shown in FIG. 14, in a slot 0, both the cell 1 and the cell 2 are soft resources, and the indication DCI simultaneously indicates availability of DU soft resources of the two cells in one time unit by using one field. However, in the slot 2 and the slot 4, a resource of only one cell is soft, and the indication DCI still indicates availability of a DU soft resource in a corresponding cell in one time unit by using one field. For the slot 2 and the slot 4, one field is used to indicate availability of a DU soft resource of a cell in one time unit, as shown in FIG. 15.

The joint indication manner is applicable to, but not limited to, a case in which multiplexing types of DU resources of a plurality of indicated cells are consistent with the MT resource, and this manner has an advantage of relatively low overheads.

In some embodiments, the indication DCI may include only a field corresponding to a time unit that needs to be indicated, but does not include a field corresponding to a time unit that does not need to be indicated. FIG. 15 is used as an example, time units 0, 2, and 4 need to be indicated (time units identified by "O" in the figure), time units 1 and 3 do not need to be indicated (time units identified by "X" in the figure), and a field corresponding to a time unit k is denoted as A(k). In this case, a field corresponding to the time units that need to be indicated is [A(0) A(2) A(4)], that is, the indication DCI includes only [A(0) A(2) A(4)], as shown in Table 3.

TABLE 3

|  | Resource number | | | | |
| --- | --- | --- | --- | --- | --- |
|  | 0 | 1 | 2 | 3 | 4 |
| DU resource of a cell 1 | S | H | H | H | S |
| DU resource of a cell 2 | S | H | S | H | H |
| Field | √ | x | √ | x | √ |

In some other embodiments, the indication DCI may include a field corresponding to a time unit that needs to be indicated, and a field corresponding to a time unit that does not need to be indicated. Further, in this manner, the time unit that does not need to be indicated may be set to a fixed value, or the IAB node may ignore a field corresponding to a resource that does not need to be indicated. FIG. 15 is used as an example, time units 0, 2, and 4 need to be indicated, and a field corresponding to an indicated time unit k is denoted as A(k). In this case, a field corresponding to the time units that need to be indicated is [A(0) A(2) A(4)], and a field corresponding to the time units that do not need to be indicated is [A(1) A(3)]. Therefore, the indication DCI may include [A(0) A(1) A(2) A(3) A(4)], but [A(1) A(3)] has a fixed value or is ignored by the IAB node.

Manner 2: Cell-by-cell indication. To be specific, one piece of second sub-information in the indication DCI may indicate availability of a DU soft resource of one cell. In this manner, the indication DCI may indicate, for a plurality of cells, availability of DU soft resources of the plurality of cells one by one.

In the cell-by-cell indication manner, the indication DCI includes H pieces of second sub-information, H is an integer greater than 0, and the second sub-information is used to indicate availability of a DU resource of one of the P cells in one or more time units.

For example, the time unit may be a slot, or may be a symbol.

The second sub-information may be considered as a bit string, or may be considered as a field. For ease of description, one piece of second sub-information in the indication DCI is referred to as a field in the indication DCI below.

In an implementation, one field may correspond to one time unit, a size of one field may be 1 bit, to indicate availability of a DU soft resource of a cell corresponding to the field in a corresponding time unit.

In another implementation, one field may correspond to n time units, and n is an integer greater than 1. One field is used to indicate availability of DU soft resources of cells corresponding to the field in n corresponding time units, and availability of DU soft resources of the cells corresponding to the field in different time units may be the same or may be different. For example, the time unit may be a symbol, and one field is used to indicate availability of a DU soft resource of a cell corresponding to the field in n symbols of one slot.

In a possible implementation, one time unit may include a plurality of sub-time units. A resource corresponding to at least one of the P cells in only some sub-time units may be a soft resource, and resources corresponding to the P cells in some other sub-time units may be hard or Null. In this case, indication DCI of a DCI field on the time unit takes effect only on the sub-time unit of the soft resource in which a resource corresponding to a cell is a soft resource. For example, one slot includes 14 symbols. DU resources of one or more of the P cells in a symbol 0 and symbols 5 to 9 are soft resources, and DU resources of the P cells in symbols 1 to 4 and symbols 10 to 13 are not soft resources. In this case, the indication DCI is only used to indicate availability of DU soft resources of the P cells in the symbol 0 and the symbols 5 to 9. If some symbols in one time unit (for example, one slot) are soft resources, and the remaining symbols are hard or null, indication of the indication DCI on the time unit is only applicable to a soft symbol.

In the implementation in which one field is used to indicate a DU soft resource of a cell corresponding to the field in one time unit, for one time unit, a DU resource of a cell is a soft resource in the time unit. In this case, availability of a DU soft resource of the cell in the time unit needs to be indicated, that is, the indication DCI includes a field corresponding to the combination of the time unit and the cell. It is assumed that the time unit is a slot. As shown in FIG. 14, in a slot 0, resources of the cell 1 and the cell 2 are both soft, but in the slot 2, only the resource of the cell 2 is soft, and in the slot 4, only the resource of the cell 1 is soft. The indication DCI may indicate availability of a DU soft resource of a cell in one time unit by using one field, as shown in FIG. 16.

In some embodiments, the indication DCI may include only a field corresponding to a DU soft resource that needs to be indicated, but does not include a field corresponding to a DU soft resource that does not need to be indicated. For example, FIG. 16 is used as an example. A slot 0 and a slot 4 of a cell 1 need to be indicated, and a slot 0 and a slot 2 of a cell 2 need to be indicated, where the slots are time units identified by "O" in the figure. Slots 1 to 3 of the cell 1 need to be indicated, and slots 1, 3 and 4 of cell 2 need to be indicated, where the slots are time units identified by "X" in the figure. A field corresponding to a time unit k of a cell c is denoted as A(c, k). In this case, a field corresponding to the time units that need to be indicated is [A(1, 0) A(1, 4) A(2, 0) A(2, 2)], as shown in Table 4.

TABLE 4

|  | Resource number | | | | |
| --- | --- | --- | --- | --- | --- |
|  | 0 | 1 | 2 | 3 | 4 |
| Resource of a cell 1 | S | H | H | H | S |
| Resource of a cell 2 | S | H | S | H | H |
| Field corresponding to the cell 1 | √ | x | x | x | √ |
| Field corresponding to the cell 1 | √ | x | √ | x | x |

A processing method for a field corresponding to a cell resource that does not need to be indicated is the same as a processing manner for a field corresponding to a time unit that does not need to be indicated in Manner 1. Details are not described herein again.

It should be noted that, in the indication DCI, fields may be sorted in a sequence of first time units and then cell numbers, or may be sorted in a sequence of first cell numbers and then time units.

The cell-by-cell indication manner is applicable to, but not limited to, a scenario such as multi-TRP transmission.

During specific implementation, Manner 1 and Manner 2 may separately perform indication, or may perform indication in combination. For example, through configuration, some resources may be jointly indicated, and some resources may be indicated cell by cell.

Manner 3: Cell group-by-cell group indication. To be specific, one piece of third sub-information in the indication DCI may indicate availability of a DU soft resource of a cell group. In this manner, the indication DCI may indicate, for a plurality of cell groups, availability of DU soft resources of the plurality of cell groups one by one.

In the cell group-by-cell group indication manner, the indication DCI includes K pieces of cell group indication DCI, one piece of cell group indication DCI corresponds to one cell group, each cell group includes at least one of the P cells, and the cell group indication DCI is used to indicate availability of a DU resource of a cell group corresponding to the cell group indication DCI.

During specific implementation, the IAB node may group the P cells into K cell groups based on a resource multiplexing relationship between a corresponding DU resource and the MT resource. Alternatively, the IAB node may group the P cells into K cell groups by using another method.

For a specific manner in which the cell group indication DCI indicates availability of a DU resource of a cell group corresponding to the cell group indication DCI, refer to Manner 1 and Manner 2. Details are not described herein again.

Figure 17:
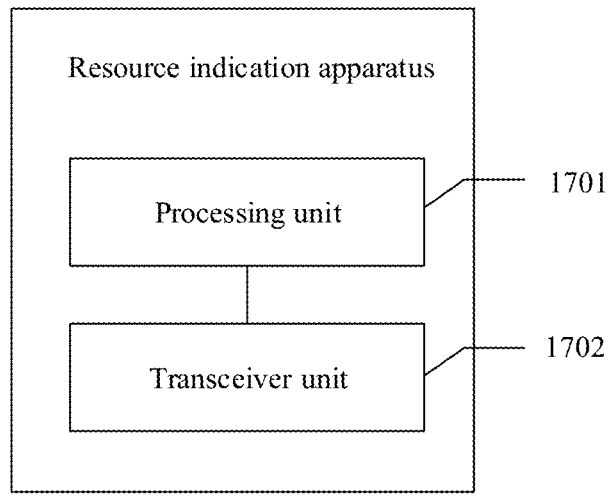
FIG. 17 is a schematic diagram of a structure of a resource indication apparatus according to an embodiment of this application.

Based on a same disclosure concept as the method embodiments, the embodiments of this application provide a resource indication apparatus. The resource indication apparatus may be specifically configured to implement the method performed by the first node in the embodiments in FIG. 10 to FIG. 16. The apparatus may be the first node, or a chip, a chipset, or a part of the chip in the first node, and the part of the chip is configured to perform a related method function. A structure of the resource indication apparatus may be shown in FIG. 17, and includes a processing unit 1701 and a transceiver unit 1702. The transceiver unit 1702 is configured to receive indication information sent by a second node, where the indication information is used to indicate availability of a dynamic resource in first resources corresponding to P cells, the first resource is a transmission resource used by a first node to communicate with a third node, the second node is an upper-level node of the first node, and the third node is a lower-level node of the first node. The processing unit 1701 is configured to: determine, in N included cells, the P cells indicated by the indication information, where 1≤P≤N; and determine the availability of the dynamic resource in the first resources of the P cells based on the indication information.

When determining, in the N included cells, the P cells indicated by the indication information, the processing unit 1701 may be specifically configured to: determine the P cells in the N cells according to a preset rule; or receive first configuration information sent by the second node, where the first configuration information is used to determine the P cells.

For example, the preset rule may be: grouping the N cells into a plurality of cell groups, where the P cells are one or more cells in a specified cell group of the plurality of cell groups.

Alternatively, the preset rule may be: the P cells are one or more of cells whose corresponding first resources each have a specified resource multiplexing relationship with a second resource, where the second resource is a transmission resource used by the first node to communicate with the second node.

Alternatively, the preset rule may be: the P cells are one or more of cells that are coplanar/codirectional/co-located/quasi co-located with a mobile termination MT of the first node.

Alternatively, the preset rule may be: grouping the N cells into a plurality of cell groups, where the P cells are cells included in a cell set, and the cell set includes one cell in each cell group.

Alternatively, the preset rule may be: the P cells are the N cells.

Alternatively, the preset rule may be: the P cells are one or more of cells configured by using second configuration information obtained by the first node, where the second configuration information is used to perform resource configuration for the cell.

A manner of grouping the N cells into a plurality of cell groups may be: grouping the N cells into a plurality of cell groups based on a resource multiplexing relationship between a corresponding first resource and a second resource.

For example, the specified resource multiplexing relationship may be time division multiplexing.

In an implementation, the indication information may include M pieces of first sub-information, M is an integer greater than 0, and one piece of first sub-information is used to indicate the availability of the dynamic resource in the first resources of the P cells in one or more time units.

In another implementation, the indication information may alternatively include H pieces of second sub-information, H is an integer greater than 0, and the second sub-information is used to indicate availability of a dynamic resource in a first resource of one of the P cells in one or more time units.

In still another implementation, the indication information may alternatively include K pieces of cell group indication information, one piece of cell group indication information corresponds to one cell group, each cell group includes at least one of the P cells, and the cell group indication information is used to indicate availability of a dynamic resource in a first resource of the cell group corresponding to the cell group indication information.

Further, each piece of cell group indication information may include L pieces of third sub-information, L is an integer greater than 0, and the third sub-information is used to indicate, in one or more time units, availability of a dynamic resource in a first resource of a cell group corresponding to the cell group indication information in which the third sub-information is included.

Alternatively, each piece of cell group indication information may include J pieces of fourth sub-information, and the fourth sub-information is used to indicate, in one or more time units, availability of a dynamic resource in a first resource of a cell in a cell group corresponding to cell group indication information in which the fourth sub-information is included.

After determining the availability of the dynamic resource in the first resources of the P cells based on the indication information, the processing unit may be further configured to determine availability of a dynamic resource in a first resource of another cell based on the availability of the first resources of the P cells, where the another cell includes one or more of cells other than the P cells in the N cells.

In the embodiments of this application, division of modules is an example, and is merely logical function division. In an actual implementation, there may be another division manner. In addition, function modules in the embodiments of this application may be integrated into one processor, or each of the modules may exist alone physically, or two or more modules may be integrated into one module. The foregoing integrated module may be implemented in a form of hardware, or may be implemented in a form of a software function module. It may be understood that, for functions or implementations of the modules in the embodiments of this application, further refer to related descriptions in the method embodiments.

Figure 18:
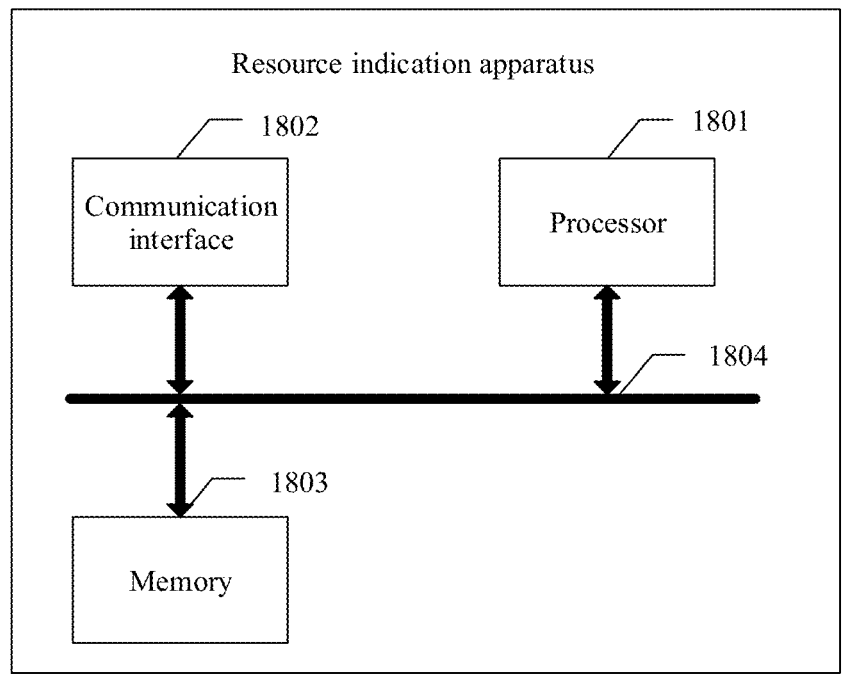
FIG. 18 is a schematic diagram of a structure of a resource indication apparatus according to an embodiment of this application.

In a possible manner, the resource indication apparatus may be shown in FIG. 18, and the apparatus may be a network device or a chip in the network device. The apparatus may include a processor 1801, a communication interface 1802, and a memory 1803. The processing unit 1701 may be a processor 1801. The transceiver unit 1702 may be a communication interface 1802.

The processor 1801 may be a central processing unit (CPU), a digital processing unit, or the like. The communication interface 1802 may be a transceiver, an interface circuit such as a transceiver circuit, a transceiver chip, or the like. The apparatus further includes a memory 1803, configured to store a program executed by the processor 1801. The memory 1803 may be a nonvolatile memory, such as a hard disk drive (HDD) or a solid-state drive (SSD), or may be a volatile memory such as a random access memory (RAM). The memory 1803 is any other medium that can be configured to carry or store expected program code that is in a form of an instruction or a data structure and that can be accessed by a computer, but is not limited thereto.

The processor 1801 is configured to execute the program code stored in the memory 1803, and is specifically configured to perform an action of the processing unit 1701. Details are not described herein again in this application. The communication interface 1802 is specifically configured to perform an action of the transceiver unit 1702. Details are not described in this application again.

This embodiment of this application does not limit a specific connection medium between the communication interface 1802, the processor 1801, and the memory 1803. In this embodiment of this application, the memory 1803, the processor 1801, and the communication interface 1802 are connected to each other by using a bus 1804 in FIG. 18. The bus is represented by using a thick line in FIG. 18, and a connection manner between other components is merely described as an example, and is not limited thereto. The bus may be classified into an address bus, a data bus, a control bus, and the like. For ease of representation, only one thick line is used to represent the bus in FIG. 18, but this does not mean that there is only one bus or only one type of bus.

An embodiment of the present disclosure further provides a computer-readable storage medium, configured to store computer software instructions that need to be executed for execution of the foregoing processor, and the computer-readable storage medium includes a program that needs to be executed for execution of the foregoing processor.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium (for example, an SSD).

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A resource indication method, the method comprising:
receiving, by a first node, indication information from a second node, wherein the indication information indicates availability of dynamic resources in first resources corresponding to P cells, wherein the first node controls N cells, $1<P<N$, the first resources are transmission resources used by the first node to communicate with a third node, the second node is an upper-level node of the first node, and the third node is a lower-level node of the first node, and wherein the indication information indicates availability of a dynamic resource in the first resources corresponding to each cell of the P cells one cell by one cell; and
determining, by the first node, the availability of the dynamic resources in the first resources of the P cells based on the indication information.

2. The method according to claim 1, wherein the indication information comprises H pieces of second sub-information, H is an integer greater than 0, and the second sub-information indicates availability of a given dynamic resource in a given resource of one cell of the P cells in one or more slots.

3. The method according to claim 2, wherein the second sub-information indicates availability of multiple symbols of the given dynamic resource in the given resource in the one or more slots.

4. The method according to claim 3, wherein the multiple symbols are all of the symbols of the given dynamic resource in the given resource in the one or more slots.

5. The method according to claim 3, wherein the multiple symbols are a part of the symbols of the given dynamic resource in the given resource in the one or more slots.

6. A first node, comprising:
at least one processor configured with processor-executable instructions to perform operations including:
receiving indication information from a second node, wherein the indication information indicates availability of dynamic resources in first resources corresponding to P cells, wherein the first node controls N cells, $1<P<N$, the first resources are transmission resources used by the first node to communicate with a third node, the second node is an upper-level node of the first node, and the third node is a lower-level node of the first node, and wherein the indication information indicates availability of a dynamic resource in the first resources corresponding to each cell of the P cells one cell by one cell; and
determining the availability of the dynamic resources in the first resources of the P cells based on the indication information.

7. The first node according to claim 6, wherein the indication information comprises H pieces of second sub-information, H is an integer greater than 0, and the second sub-information indicates availability of a given dynamic resource in a given resource of one cell of the P cells in one or more slots.

8. The first node according to claim 7, wherein the second sub-information indicates availability of multiple symbols of the given dynamic resource in the given resource in the one or more slots.

9. The first node according to claim 8, wherein the multiple symbols are all of the symbols of the given dynamic resource in the given resource in the one or more slots.

10. The first node according to claim 8, wherein the multiple symbols are a part of the symbols of the given dynamic resource in the given resource in the one or more slots.

11. A non-transitory computer storage medium, storing computer instructions that, when executed by a processor of a first node, cause the first node to perform:
receiving indication information from a second node, wherein the indication information indicates availability of dynamic resources in first resources corresponding to P cells, wherein the first node controls N cells, $1<P<N$, the first resources are transmission resources used by the first node to communicate with a third node, the second node is an upper-level node of the first node, and the third node is a lower-level node of the first node, and wherein the indication information indicates availability of a dynamic resource in the first resources corresponding to each cell of the P cells one cell by one cell; and determining the availability of the dynamic resources in the first resources of the P cells based on the indication information.

12. The non-transitory computer storage medium according to claim 11, wherein the indication information comprises H pieces of second sub-information, H is an integer greater than 0, and the second sub-information indicates availability of a given dynamic resource in a given resource of one cell of the P cells in one or more slots.

13. The non-transitory computer storage medium according to claim 12, wherein the second sub-information indicates availability of multiple symbols of the given dynamic resource in the given resource in the one or more slots.

14. The non-transitory computer storage medium according to claim 13, wherein the multiple symbols are all of the symbols of the given dynamic resource in the given resource in the one or more slots.

15. The non-transitory computer storage medium according to claim 13, wherein the multiple symbols are a part of the symbols of the given dynamic resource in the given resource in the one or more slots.

\* \* \* \* \*